United States Patent [19]

Kindersley

[11] 4,214,732
[45] Jul. 29, 1980

[54] SIDE-SPLIT BALL VALVE CONSTRUCTION

[75] Inventor: Peter G. Kindersley, Glens Falls, N.Y.

[73] Assignee: Kamyr Valves, Inc., Glens Falls, N.Y.

[21] Appl. No.: 906,789

[22] Filed: May 17, 1978

[51] Int. Cl.³ .............................................. F16K 5/06
[52] U.S. Cl. .................................................. 251/315
[58] Field of Search ......................................... 251/315

[56] References Cited

U.S. PATENT DOCUMENTS

| 2,788,016 | 4/1957 | Scherer | 251/315 |
|---|---|---|---|
| 3,191,906 | 6/1965 | Zeigler et al. | 251/208 |
| 3,193,248 | 7/1965 | Lowrey | 251/315 |
| 3,198,477 | 8/1965 | Allenbaugh, Jr. | 251/315 |
| 3,367,359 | 2/1968 | Johnson | 251/315 |
| 3,458,172 | 7/1969 | Burrows | 251/315 |
| 3,589,675 | 6/1971 | Scaramucci | 251/315 |
| 3,635,439 | 1/1972 | McNally | 251/315 |
| 3,827,671 | 8/1974 | Bolden et al. | 251/315 |
| 3,883,112 | 5/1975 | Milleville | 251/315 |
| 3,951,380 | 4/1976 | Oliva-Bonino | 251/315 |

FOREIGN PATENT DOCUMENTS 367579 2/1963 Switzerland.

Primary Examiner—William R. Cline
Assistant Examiner—H. Jay Spiegel
Attorney, Agent, or Firm—Cushman, Darby & Cushman

[57] ABSTRACT

A ball valve assembly and method of construction. The valve includes a one-piece ball and shaft in a valve housing formed of a body portion and an end portion, the body portion being cast. The body portion has a flow port at a first end thereof and a large opening at a second end thereof, and an elongated passageway is formed in the body portion for receipt of the shaft. A relatively thick wall portion is disposed toward the body first end and a relatively thin wall portion toward the body second end around the passageway. The passageway can be smooth bore or threaded throughout its length. A scallop may be formed in the relatively thin wall portion extending substantially perpendicular to the direction of elongation of the passageway, the scallop being machined or being formed during casting. The shaft is inserted through the body portion large opening and through the scallop to and through the passageway, and then the ball is moved so that it is in sealing relationship with sealing means associated with the body portion. The end portion is connected to the body portion, and a bushing is affixed in operative association with the passageway threads or bore for supporting and sealing the shaft. The interfaces between the body portion and the end portion, and between the bushing and the body portion may be welded where a poisonous fluid or the like is to be valved by the assembly.

7 Claims, 6 Drawing Figures

SIDE-SPLIT BALL VALVE CONSTRUCTION

BACKGROUND AND SUMMARY OF THE INVENTION

According to the present invention, a ball valve assembly is provided that utilizes a one-piece ball and shaft yet is simple to construct, the housing components thereof preferably being formed by casting, is economical to construct, avoids the problems associated with center split body gaskets, and allows the utilization of the screwed-in bushing for the shaft, which has advantages with respect to ease of assembly and construction.

Valves having one-piece ball and shaft arrangements are advantageous since backlash and dead band do not occur when trying to position the ball accurately for use as a flow control valve, since there is never any possibility of a dead space in a joint, as can occur with a separate ball and shaft arrangement. Also, a one-piece ball and shaft may be coated with corrosion resistent plastic or metal without risk of damage to the coating when torque is applied, the ball can be electrically grounded effectively by grounding the shaft outside the valve, the ball can—from outside the valve—be pushed into engagement with the valve seats inside the valve by imparting a side push on the shaft in the opposite direction using the shaft as a lever, and the ball is prevented from vibrating inside the valve due to flow turbulence.

In the past, there have been proposals for constructing valves having an integral ball and stem utilizing a center split body, such as shown in Canadian Pat. No. 978,172. However, such an arrangement has the disadvantage in that the body gasket is split at the shaft packing area. There have been other proposals, such as shown in U.S. Pat. Nos. 3,635,439 and 3,951,380, that avoid the problem of a center split body, however, because of the difficulties inherent in constructing side split bodies that allow the insertion of an integral ball and shaft, the type of bushings utilizable with such assemblies have been limited, and the configurations of the structure have not lent themselves to simple forms of construction, such as casting.

According to the present invention, a ball valve assembly having a one-piece ball and shaft is provided that does not have a center split body, yet may utilize simple screw-in bushings, and may be readily assembled using cast housing components. The invention also relates to a method of construction of such a ball valve assembly having a one-piece ball and shaft.

The ball valve assembly according to the present invention comprises a one-piece ball and shaft, the ball having a flattened portion adjacent the shaft and having a through bore. A valve housing comprises a body and an end cap. The body defines a central chamber and has a flow port at a first end thereof and defines an opening at a second end thereof substantially larger than the flow port. The end cap cooperates with the body second end at a second end thereof, and defines a flow port at a first end thereof. Means are provided for attaching the body and the end cap together in sealing relationship so that fluid may flow through the fluid ports. Means defining an elongated passageway in the body are also provided, the passageway for receipt of the shaft, and in one variation the defining means including a threaded wall portion including a relatively thick wall portion toward the body first end and a relatively thin wall portion toward the body second end, threads extending on the relatively thick wall portion past the termination of the relatively thin wall portion in the direction of elongation of the passageway. In another variation, the passageway is smooth and the bushing is bolted onto the body. The first sealing means, associated with the body, are provided encircling the body fluid port for cooperation with the ball, and second sealing means, associated with the end cap, are provided encircling the end cap fluid port for cooperation with the ball. The opening in the second end of the body is large enough to allow passage of the one-piece ball and stem therethrough so that the stem can pass through the passageway and the ball seated in cooperation with the first sealing means. Also, bushing means are provided for cooperating with the threaded or bored passageway of the body, and supporting and sealing the shaft. A scallop may be formed in the relatively thin wall portion and extending substantially perpendicular to the direction of elongation of the passageway to facilitate insertion of the one-piece ball and stem, the scallop being easily formable during casting, or by machining.

Where deadly poisons and the like are to be valved an all-welded valve is provided. Thin sections are provided at all interfaces between the end cap and the body, and light sealing welded joints are provided at all interfaces between the end cap and the body, as well as between thin sections of the bushing and the body. Bolts extending between flange portions of the end cap and body also may be provided to take the body stresses so that the weld is not stressed. In situations where poisonous fluids are not to be valved, the weld attaching means may be replaced by sealing rings in contact with particularly shaped portions of the body and end cap.

The present invention also contemplates a method of construction of a ball valve that is simple yet may utilize a one-piece ball and shaft. The method includes the steps of forming a one-piece ball and shaft, casting a valve housing body, forming an end cap, and forming a bushing. The valve housing body so cast has a flow port at a first end thereof and an opening at a second end thereof, and is adapted to receive sealing means encircling the flow port for cooperation with the ball; an elongated passageway for receipt of the shaft, the passageway being threaded in a relatively thick wall portion defining the passageway toward the first end of the body, and a relatively thin wall portion defining the passageway toward the second end of the body, threads extending on the thick wall portion past the termination of the thin wall portion in the direction of elongation of the passageway; and a scallop formed in the thin wall portion extending substantially perpendicular to the direction of elongation of the passageway. The end cap formed cooperates with the body second end at a second end thereof, and defines a flow port at a first end thereof, and is adapted to receive sealing means encircling the flow port for cooperation with the ball. The bushing has exterior threads corresponding to the threads in the body passageway. The method includes the further steps of inserting the shaft through the body opening and through the scallop to and through the passageway, and then moving the ball so that it is in sealing relationship with sealing means in the body, bringing the end cap into cooperative relationship with the body while simultaneously bringing end cap sealing means into sealing engagement with the ball, attaching the end cap and body together in sealing relationship, and screwing the bushing into operative association with the body passageway threads, for supporting and sealing the shaft.

The method according to the invention also may include practicing the casting and end cap forming steps so as to form thin sections of the body around the periphery of the second end thereof, and of the end cap around the periphery of the second end thereof, and by accomplishing the attaching step by welding the thin sections along all the interfaces between the body and the end cap together. Similarly, a thin section may be formed around a top peripheral portion of the bushing, and the thin section welded to the body. Flanges may be formed on the body and the end cap, and bolts passed through openings in the flanges to take the body stresses between the body and end cap so that the welds will not be stressed.

It is the primary object of the present invention to provide a simple and efficient ball valve assembly, and method of construction thereof. This and other objects of the invention will become clear from an inspection of the detailed description of the invention, and from the appended claims.

DETAILED DESCRIPTION OF THE DRAWINGS

Figure 3:
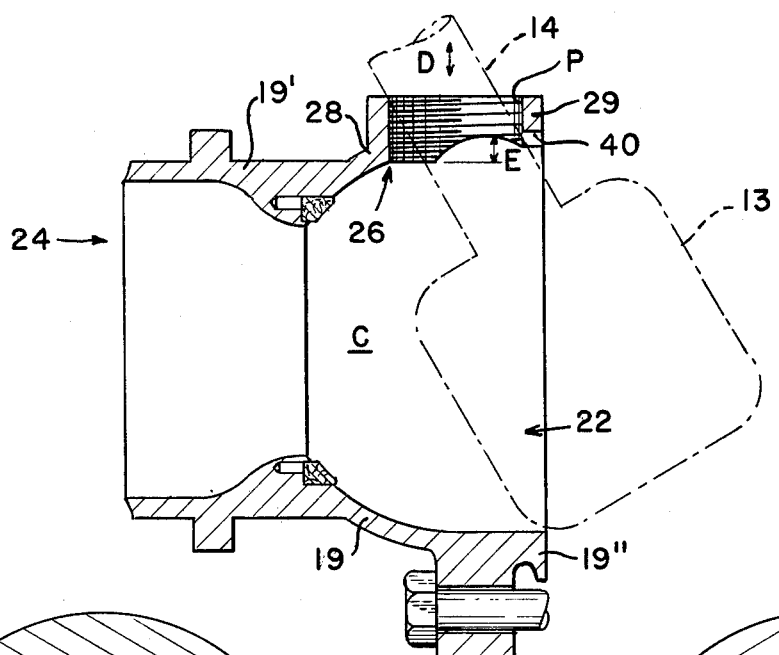
FIG. 3 is a side sectional view of the body of the assembly of FIG. 1, showing the valve and stem in dotted line being inserted into the body.

An exemplary ball valve assembly according to the invention is indicated generally at 10 in the drawings. The assembly includes a one-piece ball and shaft arrangement, the ball 13 and shaft 14 being integral, and the ball 13 having a flattened portion 15 adjacent the shaft, and having a through bore 16 to allow passage of fluid therethrough when the valve is in the open position. The valve housing for the one-piece ball and shaft 12 is indicated generally at 18 in the drawings, and includes a body 19 and an end cap 20. The body 19 defines a central chamber C (see FIG. 3) and has a flow port 24 at a first end 19' thereof, and defines an opening 22 at a second end 19" thereof, the opening 22 being substantially larger than the flow port 24. The end cap 20 has a first end 20' defining a flow port 24', and a second end 20" for cooperation with the second end 19" of the body 19. Means 26 (see FIG. 3 in particular) define an elongated passageway P in the body 19 for receipt of the shaft 14, the means 26 including a threaded wall portion including a relatively thick wall portion 28 toward the body first end 19', and a relatively thin wall portion 29 toward the body second end 19". As can be seen in FIG. 3, threads extend on the relatively thick wall portion 28 past the termination of the relatively thin wall portion 29 in the direction D of elongation, the extent of the threads of wall portion 28 past wall portion 29 being indicated by extension line at E in FIG. 3.

Figure 1:
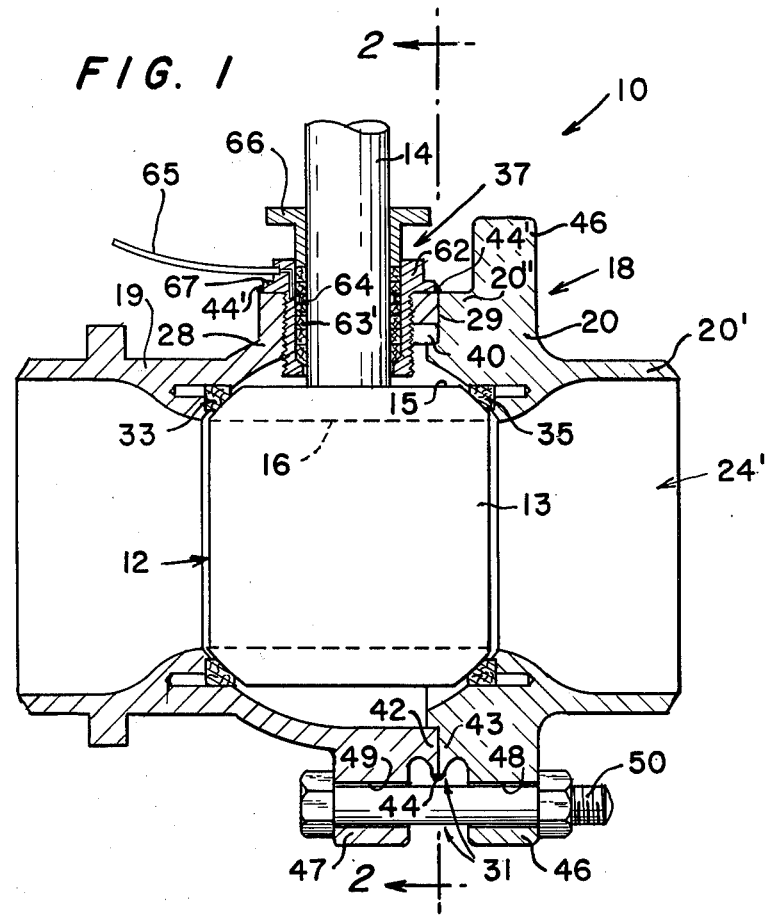
FIG. 1 is a side view, partly in section and partly in elevation, showing an exemplary ball valve assembly according to the invention.
Figure 4:
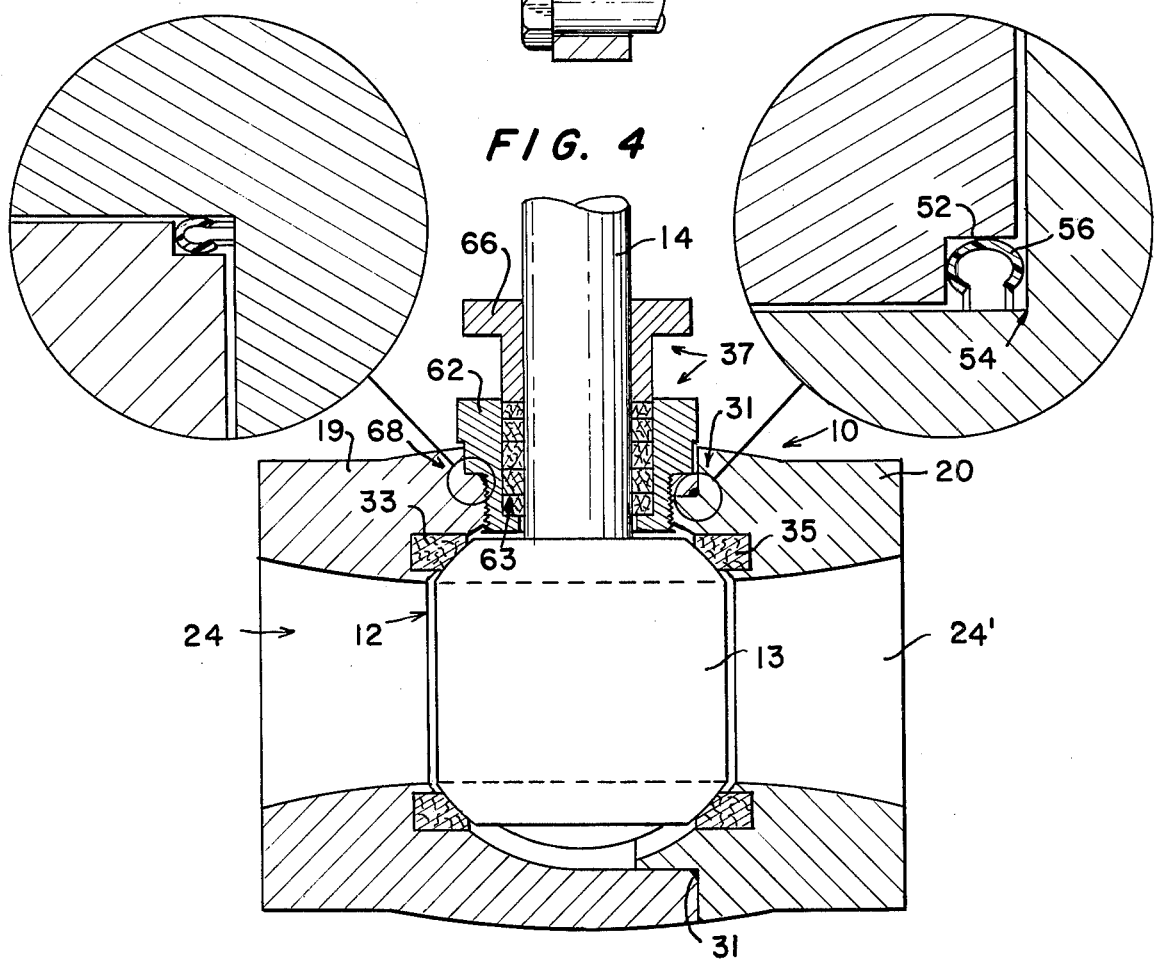
FIG. 4 is a side view partly in section and partly in elevation of another embodiment of an assembly according to the invention.

The assembly 10 further includes means, indicated generally at 31 in FIGS. 1 and 4, for attaching the body 19 and the end cap 20 together in sealing relationship so that fluid may flow through the fluid ports 24, 24' when the valve is in an open position, first sealing means 33 associated with the body 19, encircling the body fluid port 24 and for cooperation with the ball 13, and second sealing means 35, associated with the end cap 20, encircling the end cap fluid port 24' for cooperation with the ball 13. The opening 22 at the second end 19" of the body is large enough to allow passage of the one-piece ball and stem therethrough so that the stem can be passed through the passageway P and the ball seated in cooperation with the first sealing means 33, an initial stage of the passage of the one-piece ball and stem 12 into relationship with the body portion 19 being indicated in FIG. 3. Bushing means 37 also are provided for cooperating with the threaded passageway P and supporting and sealing the shaft 14 in the assembled condition (FIGS. 1 and 4). The screw threaded engagement of the bushing allows for quick and easy assembly of the component parts together, with good reliability.

Figure 2:
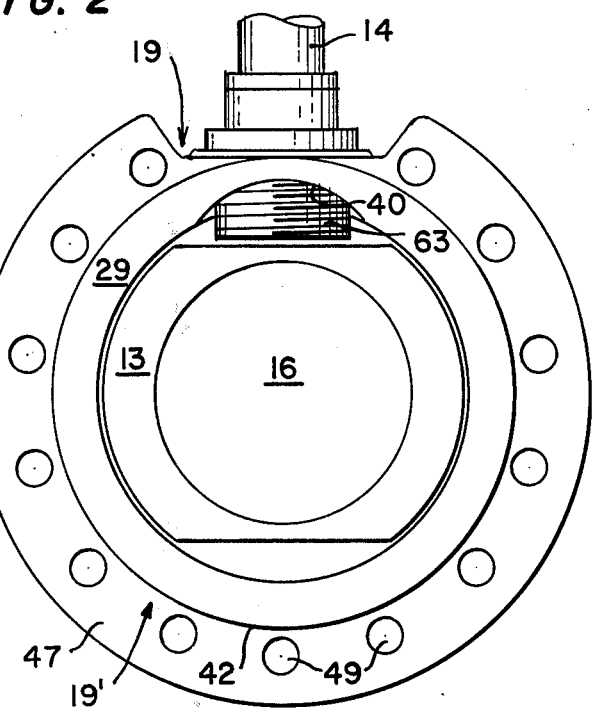
FIG. 2 is an end view of a portion of the assembly of FIG. 1, taken along lines 2—2 of FIG. 1.

Since the assembly 10 according to the present invention has a body 19 with a relatively thin top portion, the shaft 14 can be tilted sufficiently to easily allow its entry into operative relationship with the body 19. Where the relative dimensions of the components dictates, also a scallop 40 (see FIGS. 1 and 2 in particular) may be provided in the relatively thin wall portion 29 extending substantially perpendicular to the direction D of elongation of the passageway P. The scallop 40 facilitates entry of the shaft 14 into the passageway P during assembly.

The primary distinctions between the FIGS. 1 and 4 embodiments is in the particular attaching means 31 utilized. In the FIGS. 1 through 3 embodiment, the assembly 10 is designed for valving poisonous fluid or the like which cannot be used with valves with gasketed joints in case of leakage. Such an embodiment is an all-welded valve. The attaching means 31 includes thin sections 42 of the body around the periphery of the second end 19" thereof, and thin sections 43 of the end cap 20 around the periphery of the second end 20" thereof. A simple, leak-tight weld 44 may be provided at the thin sections, the thin sections 42,43 being provided at all interfaces between the end cap 20 and body 19, and similarly light sealing welds 44 being provided at all such interfaces. Since the weld 44 is only a light sealing weld, it may easily be cut off for servicing the valve and rewelded with another light weld. Additionally, it is preferred to provide means for taking the body stress so that the weld 44 is not stressed, and such stress taking means preferably comprise flanges 46, 47 formed on the end cap 20 and body 19 respectively, the flanges extending radially outwardly from the thin sections 42,43 (see FIG. 2 in particular), and a plurality of openings 48,49 respectively, being formed in the flanges 46,47, bolts 50 passing through the openings and attaching the components 19,20 together.

Figure 5:
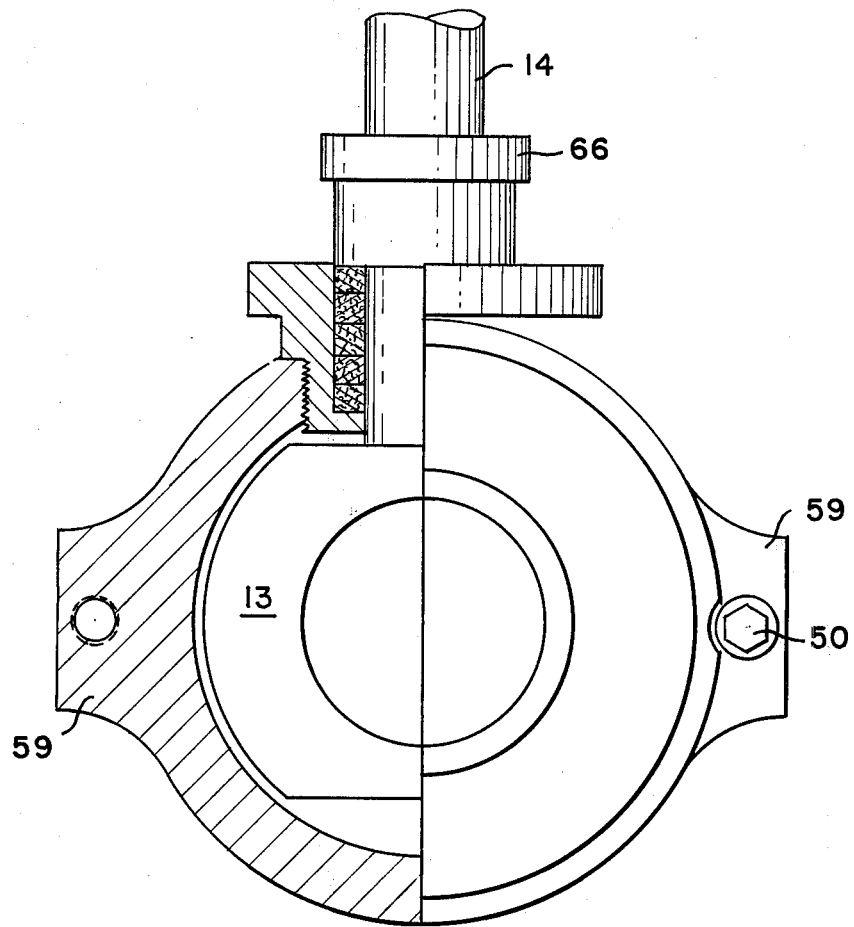
FIG. 5 is a split-end view of the exemplary embodiment of FIG. 4.

The embodiment illustrated in FIGS. 3 and 5 is designed for valving normal fluids, not poisonous ones, and therefore the attaching means 31 preferably comprise a square annular portion 52 formed on one of the body and end cap (shown formed on the body 19 in FIG. 4), and an annular corner 54 formed on the other of the body and end cap (shown formed on the end cap 20 in FIG. 4), with a sealing ring 56 disposed between the portion 52 and corner 54. Ears 59 (see FIG. 5) are also provided on each of the components 19,20, with bolts 50 extending through openings in the ears 59 for clamping the components 19,20 together with the sealing being provided by the ring 56.

The bushing means 37 includes a tubular member 62 having exterior threads 63 thereon (see FIG. 2) corresponding to the threads in the body passageway P, and further includes a plurality of packing rings 63' disposed between the interior surface thereof and the shaft 14. Additionally, in the FIG. 1 embodiment where poisonous fluids will normally be valved, a lantern ring 64 may also be provided, and a pressurized purge fluid supplied through conduit 65 effecting a fluid seal of the packings 63'. A gland 66 also is provided for compressing the packing rings 63, the gland 66 being attached to the body 19 by any suitable means. A thin section 67 preferably formed around the top peripheral portion of the member 62 in the FIG. 1 embodiment, and a light sealing weld 44' is provided around the periphery of the portion 67, welding it to the top of the body 20. In the FIG. 4 embodiment, this same type of sealing may be provided by a sealing ring arrangement indicated generally at 68, which may include the grooved and corner portions much like those 52,54 between the components 19,20.

Figure 6:
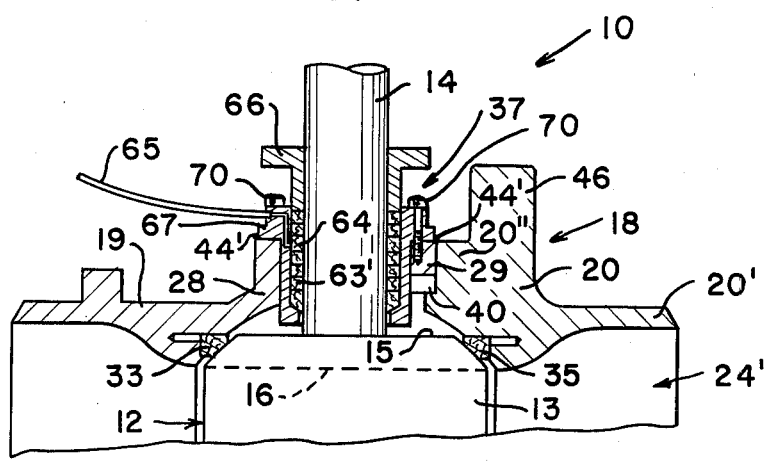
FIG. 6 is a side detail view of an assembly like that of FIG. 1 only with a different bushing attachment.

The embodiment of FIG. 6 is substantially the same as that of FIG. 1, except that instead of threads being provided in passageway P it is smooth-walled, and thus the member 62 is also smooth-walled and in sliding engagement with the passageway P. The bushing means 37 is held in sealing engagement with the body 19 by a plurality of bolts 70 passing through and in threaded engagement with threaded openings formed in the member 62 and body 19, as shown in FIG. 6.

The method of construction of a ball valve assembly 10 according to the invention comprises the steps of forming a one-piece ball and shaft 12, casting a valve housing body 19, forming an end cap 20, and forming a bushing 37. Casting is a simple and efficient way to construct the body 19, and it is possible to cast the body 19 yet provide a structure for facilitating entry of the shaft 14 into the passageway P by providing a scallop 40 extending perpendicular to the direction D of elongation of the passageway P. The method further includes the steps of inserting the shaft 14 through the body opening 22 and through the scallop 42 and through the passageway P, and then moving the ball 13 so that it is in sealing relationship with the sealing means 33 in the body 19, the initial stage of the insertion being indicated at dotted line in FIG. 3, and the final relationship being shown in FIG. 2. The end cap 20 is brought into cooperative relationship with the body 19 by bringing the second ends 19",20" thereof into abutting engagement, while the sealing means 35 are simultaneously brought into engagement with the ball 13. The end cap 20 and body 19 are then attached together in sealing relationship, and the bushing member 62 is brought into operative association with the body passageway P, for supporting and sealing the shaft 14, utilizing threads 63 or bolts 70. The step of attaching the components 19,20 together may be accomplished by welding the thin sections 42,43 along all the interfaces between the components 19, 20 together, and the method may include the further step of welding the thin section 67 to the body 19. The attaching step may further be accomplished by passing bolts 50 through the openings 49,48 in the flanges 47,46 respectively, to clamp the components 19,20 together and ensure that the welds 44 will not be stressed. The sealed attachment step may also be practiced as illustrated in FIGS. 4 and 5 utilizing the ears 59 and bolts 50 and the sealing ring 56.

It will thus be seen that according to the present invention, a simple yet efficient ball valve and method of construction thereof have been provided that allow the utilization of a one-piece ball and stem yet provide easy and efficient assembly of the valve. While the invention has been herein shown and described in what is presently conceived to be the most preferred and practical embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A ball valve assembly comprising:
   a one-piece ball and shaft, said ball having a flattened portion adjucent said shaft and having a through bore;
   a valve housing comprising a body defining a central chamber, and having a flow port at a first end thereof and defining an opening at a second end thereof substantially larger than said flow port; and an end cap cooperating with said body second end at a first end thereof;
   means for attaching said body and said end cap together in sealing relationship so that fluid may flow through said fluid ports;
   means defining a passageway in said body for receipt of said shaft, said passageway being elongated in a direction perpendicular to said flow port, and said means including a thick wall portion that is relatively thick in the direction of elongation of said passageway, and a thin wall portion that is relatively thin in the direction of elongation of said passageway, said thick wall portion disposed toward said body first end, and said thin wall portion toward body second end, and a scallop being formed in said thin wall portion, said scallop effecting a reduction of thickness of said thin wall portion in the direction of elongation of said passageway at a central portion thereof; said means defining said elongated passageway further including a threaded wall portion which includes said thick and thin wall portions, threads extending on said relatively thick wall portion in the direction of elongation of said passageway past the termination of said relatively thin wall portion in the direction of elongation of said passageway;
   first sealing means, associated with said body, encircling said body fluid port for cooperation with said ball,
   second sealing means, associated with said end cap, encircling said end cap fluid port for cooperation with said ball,
   said opening at said second end of said body being large enough to allow passage of said one-piece ball and stem therethrough so that said stem can be passed through said scallop and then through said passageway, and said ball seated in cooperation with said first sealing means, and
   bushing means for cooperating with said passageway and supporting and sealing said shaft.

2. An assembly as recited in claim 1 wherein said means for attaching said end cap and said body together comprises light sealing welded joints at all interfaces between said end cap and body.

3. An assembly as recited in claim 2 wherein said attaching means further comprises means for taking body stress so that said welded joints will not be stressed.

4. An assembly as recited in claim 3 wherein said stress taking means comprise a flange formed on each of said body and said end cap and extending radially outward from said body and end cap, respectively, at all interfaces between said end cap and body, a plurality of openings being formed in said flanges, and bolts passing through said openings.

5. A ball valve assembly comprising:
a one-piece ball and shaft, said ball having a flattened portion adjacent said shaft and having a through bore;
a valve housing comprising a body defining a central chamber, and having a flow port at a first end thereof and defining an opening at a second end thereof substantially larger than said flow port; and an end cap cooperating with said body second end at a first end thereof;
means for attaching said body and said end cap together in sealing relationship so that fluid may flow through said fluid ports;
means for defining a passageway in said body for receipt of said shaft, said passageway being elongated in a direction perpendicular to said flow port, and said means including a thick wall portion that is relatively thick in the direction of elongation of said passageway, and a thin wall portion that is relatively thin in the direction of elongation of said passageway, said thick wall portion disposed toward said body first end, and said thin wall portion toward said body second end, and a scallop being formed in said thin wall portion, said scallop effecting a reduction of thickness of said thin wall portion in the direction of elongation of said passageway at a central portion thereof; said passageway being smooth-walled and said end cap being slidingly engaged with and bolted to said body;
first sealing means, associated with said body, encircling said body fluid port for cooperation with said ball,
second sealing means, associated with said end cap, encircling said end cap fluid port for cooperation with said ball,
said opening at said second end of said body being large enough to allow passageway of said one-piece ball and stem therethrough so that said stem can be passed through said scallop and then through said passageway, and said ball seated in cooperation with said first sealing means, and
bushing means for cooperating with said passageway and supporting and sealing said shaft.

6. An assembly as recited in claim 5 wherein said means for attaching said end cap and said body together comprises light sealing welded joints at all interfaces between said end cap and body.

7. An assembly as recited in claims 1 or 5 wherein said means for attaching said body and end cap in sealing relationship comprise a recessed annular portion formed on one of said body and end cap, an annular corner formed on the other of said body and end cap, and a sealing ring disposed between said recessed portion and said corner.

* * * * *